(12) United States Patent
Colbachini

(10) Patent No.: US 7,347,226 B2
(45) Date of Patent: Mar. 25, 2008

(54) FLEXIBLE HOSE FOR FUELS AND METHOD FOR MAKING IT

(75) Inventor: Giuseppe Aldinio Colbachini, Padua (IT)

(73) Assignee: IVG Colbachini S.p.A., Padua (IT)

( * ) Notice: Subject to any disclaimer, the term of this patent is extended or adjusted under 35 U.S.C. 154(b) by 233 days.

(21) Appl. No.: 11/216,656

(22) Filed: Aug. 31, 2005

(65) Prior Publication Data

US 2006/0260706 A1    Nov. 23, 2006

(30) Foreign Application Priority Data

May 23, 2005   (IT) ................. MI2005A0941

(51) Int. Cl.
*F16L 11/08* (2006.01)
(52) U.S. Cl. ............... 138/126; 138/133; 138/127; 138/137; 138/125
(58) Field of Classification Search ........... 138/126, 138/125, 137, 140, 124, 127, 133
See application file for complete search history.

(56) References Cited

U.S. PATENT DOCUMENTS

| 4,140,154 | A | * | 2/1979 | Kanao ................. 138/132 |
| 4,261,390 | A | * | 4/1981 | Belofsky .............. 138/125 |
| 4,463,779 | A | * | 8/1984 | Wink et al. .......... 138/125 |
| 4,862,923 | A | * | 9/1989 | Kitami et al. ........ 138/125 |
| 4,907,626 | A | * | 3/1990 | Mori .................... 138/126 |
| 5,957,164 | A | * | 9/1999 | Campbell ............. 138/137 |
| 6,213,155 | B1 | * | 4/2001 | Furuta et al. ......... 138/123 |
| 6,390,141 | B1 | * | 5/2002 | Fisher et al. ......... 138/137 |
| 6,536,479 | B2 | * | 3/2003 | Wilson et al. ........ 138/137 |
| 6,742,545 | B2 | * | 6/2004 | Fisher et al. ......... 138/137 |
| 6,941,975 | B2 | * | 9/2005 | Wilson et al. ........ 138/141 |
| 2004/0040607 | A1 | * | 3/2004 | Wilson et al. ........ 138/137 |
| 2004/0118469 | A1 | * | 6/2004 | Wilson et al. ........ 138/137 |

* cited by examiner

*Primary Examiner*—Patrick F. Brinson
(74) *Attorney, Agent, or Firm*—Hedman & Costigan P.C.

(57) ABSTRACT

A flexible hose for fuels comprises a rubber inner layer, at least a reinforcement fabric layer and a covering rubber layer and, moreover, at least a fuel vapor low permeability material layer. With respect to prior flexible hoses for fuels, the inventive flexible hose has the advantage that it drastically lowers the gas leakages through the flexible hose wall, so as to meet the requirements of the enforcing rules in this field.

11 Claims, 3 Drawing Sheets

FLEXIBLE HOSE FOR FUELS AND METHOD FOR MAKING IT

BACKGROUND OF THE INVENTION

The present invention relates to a flexible hose for conveying fuels.

The invention also relates to the method for making the subject flexible hose.

More specifically, the field of the invention is that of flexible hoses (usually made of rubber) used for conveying fuels such as gasoline, Diesel oils and so on, for example for fueling boats, motor vehicles and for heating applications and the like.

As is known, said prior flexible hoses are conventionally made of a polymeric material, in particular based on nitrilic compounds: however, said prior hoses have a comparatively high permeability to liquid phase vapors from the fuel liquid conveyed in the flexible hose.

Tests performed on samples of a flexible hose of the above mentioned type have shown an average fuel gas permeability corresponding to 300 g/m$^2$/day, as measured by the USA measurement test method SAE J 1527, "Marine Fuel Hoses"

On the other hand, future requirements will require a drastic lowering of the above mentioned value, even to a small limit of 5-15 g/m$^2$/day.

SUMMARY OF THE INVENTION

Thus, the main object of the present invention is to provide such a flexible hose which has a very small permeability for the fuel gases evolved by the fuels conveyed thereby.

Another object of the present invention is to provide such a flexible hose for conveying fuels, and a method for making it, which are adapted to meet very severe permeability limits as imposed by recent enforcing rules in this field.

Acording to one aspect of the present invention, the above mentioned objects, as well as yet other objects, which will become more apparent herein after, are achieved by a flexible hose and metyhod for making it according to claims 1 and 7 respectively.

Further preferred embodiments of the invention are disclosed in the remaining claims.

With respect to prior flexible hoses for conveying fuels, the inventive flexible hose provides the advantage that it drastically lowers the gas leakages through its wall, thereby meeting very severe limits as enforced by recent law requirements.

BRIEF DESCRIPTION OF THE DRAWINGS

The above mentioned and other objects, characteristics and advantages of the present invention will become more apparent hereinafter from the following detailed disclosure of a preferred embodiment of the flexible hose according to the invention, which is illustrated, by way of an indicative, but not limitative, example in the accompanying drawings, where.

DESCRIPTION OF THE PREFERRED EMBODIMENTS

Figure 1:
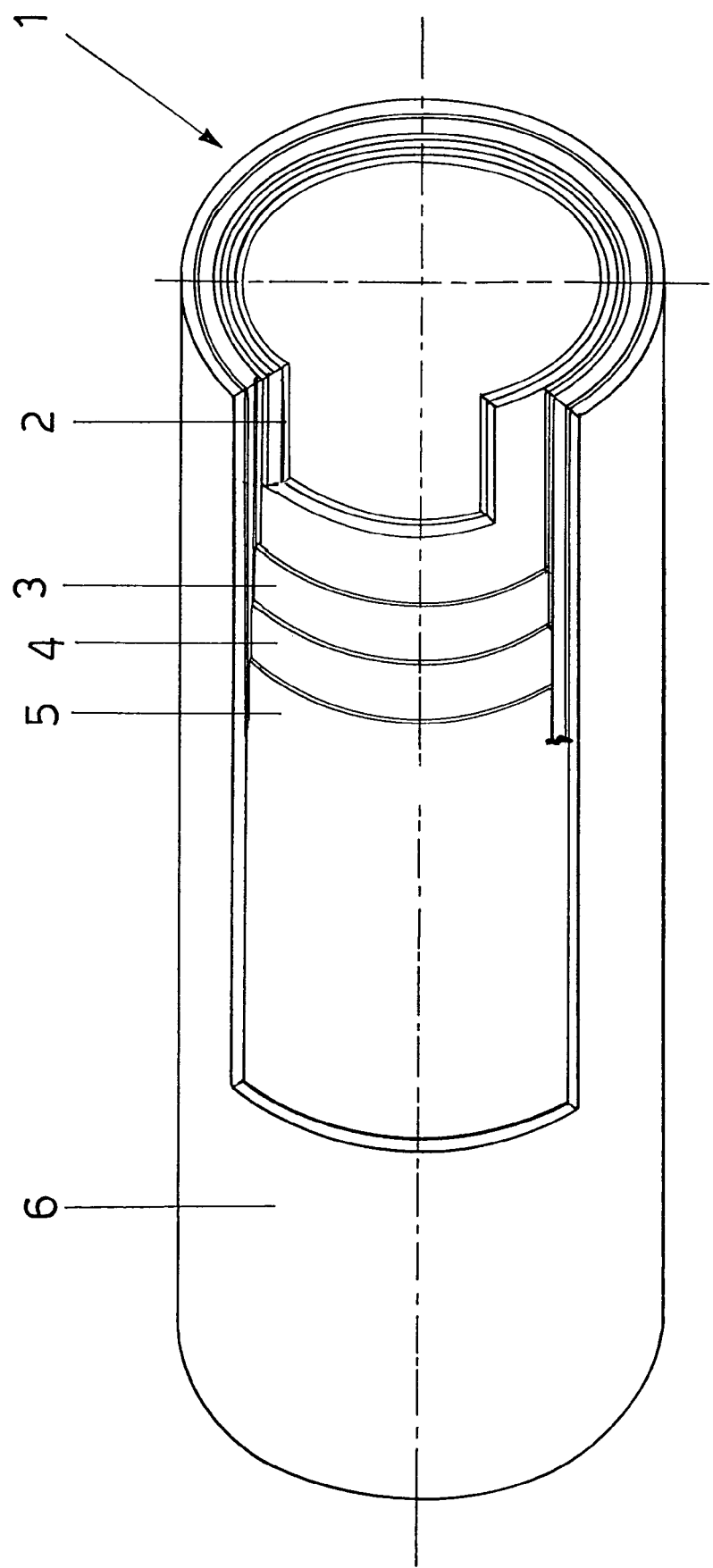
FIG. 1 shows a first embodiment of the flexible hose according to the invention.

The flexible hose shown in FIG. 1 has been specifically designed for conveying fuels in general (for boats, tank transport, motor vehicle fields and so on).

Said flexible hose 1 comprises:

an inner layer 2 made of rubber or a polymeric material;
a further layer 3, applied on said layer 2 and made of a polyamide material, having a low fuel vapor permeability;
a further layer 4, of rubber, applied on said layer 3, and having a composition either equal or different from the composition of the layer 2;
a reinforcement fabric 5, made either of an intertwined or not material, covering said layer 4; and
a covering rubber layer 6.

The polyamide material forming said layer 3 is preferably nylon 6, nylon 6,6 or nylon 12.

Said layer 3, in particular, is applied by a winding or extruding method on the rubber layer 2, by performing a preliminary adhesive process, or even a thermal process, the function of which is to affix or attach the layer 3 both to the bottom rubber layer 2 and to the top layer 4.

Figure 2:
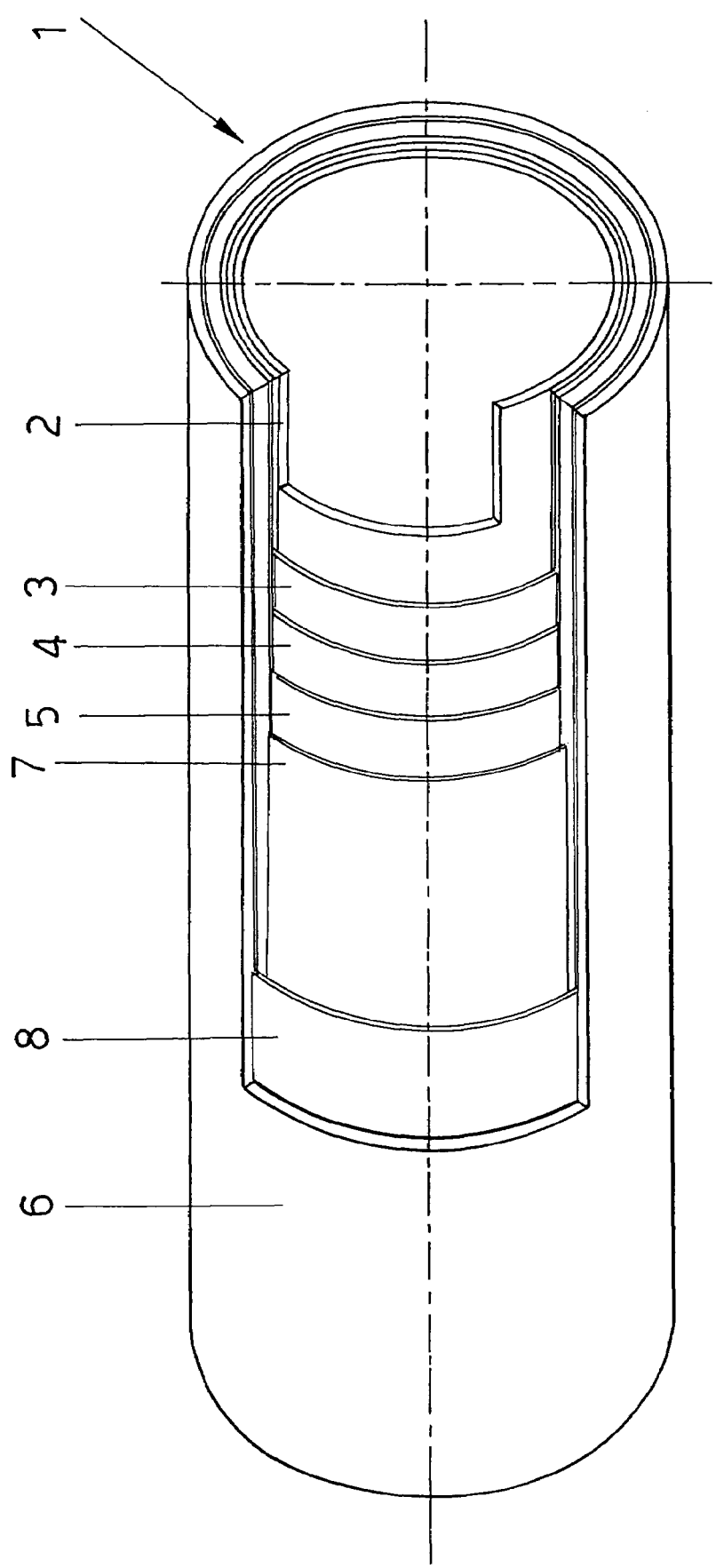
FIGS. 2 and 3 show modified embodiments of the flexible hose shown in FIG. 1.

In the modified embodiment shown in FIG. 2, a rubber layer 7 is applied on the reinforcement fabric layer 5, said rubber layer 7 being in turn covered by a further reinforcement cloth material, on which is attached a rubber covering layer 6.

The reinforcement cloth or fabric material layer 5 and 8 could be wound directly onto one another, without an intermediate rubber layer 7.

Figure 3:
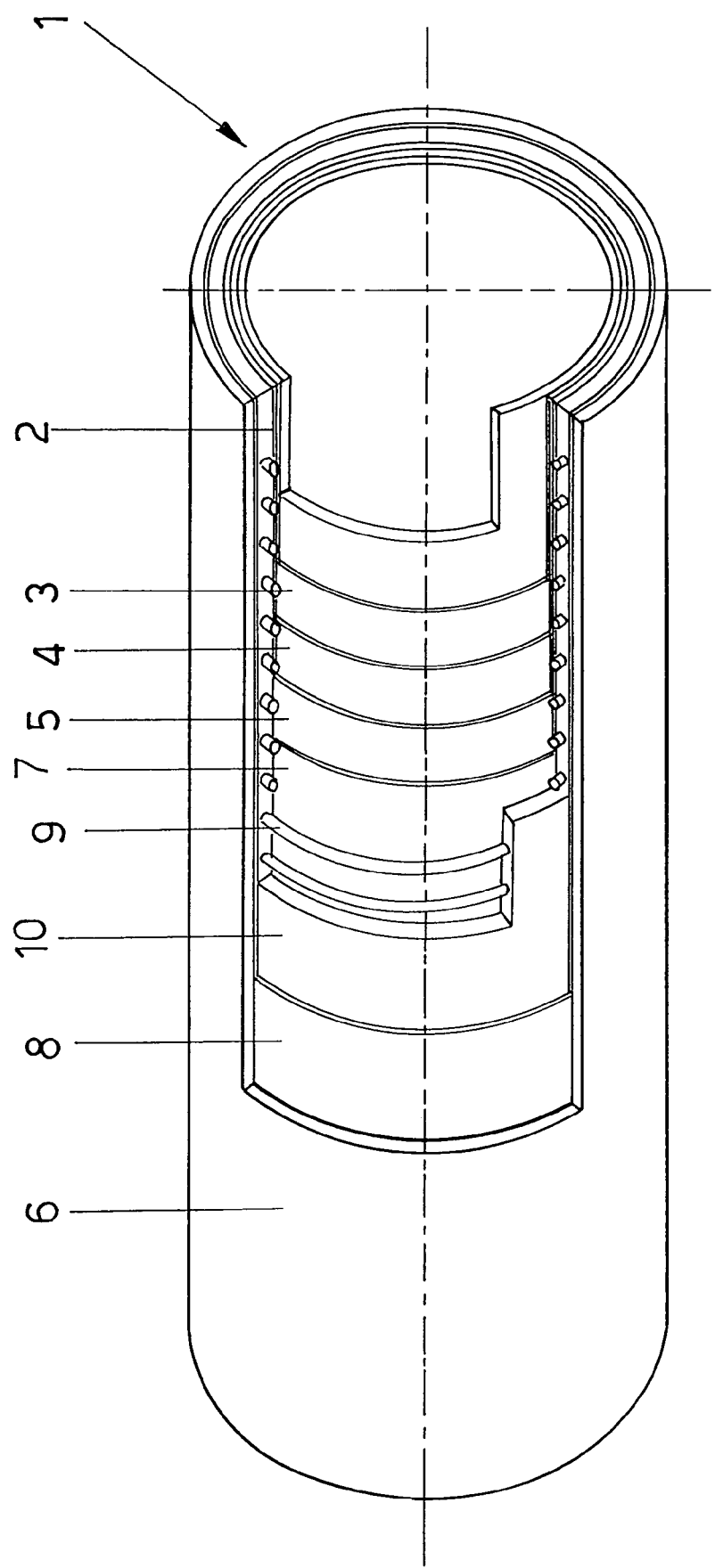

In the modified-embodiment shown in FIG. 3, on the rubber layer 7 is applied a reinforcement coil 9 preferably of a metal material, adapted to allow the flexible hose 1 to hold its target or designed bending radius, without any collapsing or deforming, as caused, for example, by bending the flexible hose.

The metal coil 9, in particular, is in turn embedded in a rubber layer 10, thereon are then applied, in succession, the reinforcement cloth or fabric material 8 and the rubber cover 6.

Alternately, the cloth or fabric material 8 can be also directly arranged under the metal coil 9 and, accordingly, directly contacting the fabric material 5.

The thicknesses of the above mentioned layer can be selected among a lot of suitable thicknesses or gauges, depending on the flexible tube size and design data.

To demonstrate the efficiency of the inventive flexible tube against fuel vapor leakages, in particular through the wall of said flexible hose, the flexible hose or tube 1 of FIG. 3 has been subjected to test according to the standard SAE J 1527, paragraph "15.2 Rate of Fuel Permeation Test", A type, lass 1.

In this test, three hose lengths of 300 mm each have been coupled to a tank filled by a C-type test liquid.

The sample under test, i.e. the hose and tak, has been weighted with an accuracy of 0.01 g and the original weight has been recovered each 24 h. the permeability degree has been calculated as the weight loss of the sample.

In this test analysis procedure, the greatest permeability level found on the samples in a time period of 15 days at 23° C. was less then 5 g/m$^2$/day (1.58 g/m$^2$/day, as the better result).

The invention, as above disclosed, is susceptible to several modifications and variations, all of which will come within the scope of the accompanying claims.

Thus, for example, the subject flexible hoses could be provided with additional coatings, or with different material covers, with a different order of the layers and, optionally, also with further polyamide additional layers.

The invention claimed is:

1. A flexible hose for conveying fuels, of the type comprising a rubber or polymeric inner layer (2), a further layer (3) covering said rubber or polymeric inner layer (2), a $2^{nd}$ layer (4) of rubber applied on said further layer (3) a reinforcement fabric layer (5) covering said $2^{nd}$ rubber layer (4), a $3^{rd}$ rubber layer (7) applied on said fabric layer (5), a $4^{th}$ rubber layer (10) applied on said $3^{rd}$ rubber layer (7) and a covering rubber layer (6), wherein said further layer (3) is made of a low fuel vapor permeabiliy material and wherein said $4^{th}$ rubber layer (10) includes a reinforcement coil arrangement (9) embedded therein.

2. A flexible hose according to claim 1, characterized in that said low permeability material is a polyamide.

3. A flexible hose according to claim 2, characterized in that said polyamide is nylon 6, nylon 6,6 or nylon 12.

4. A flexible hose according to claim 1, wherein a reinforcement layer (8) made of cloth or fabric material is provided over said $4^{th}$ rubber layer (10) or alternatively, under said $4^{th}$ rubber layer (10), in direct contact with fabric layer (5).

5. A flexible hose according to claim 1, characterized in that said flexible hose has a fuel vapor permeability, according to SAE J 1527 less than 5 g/m.sup.2/day.

6. A flexible hose according to claim 5, characterized in that said permeability is of 1.58 g/m.sup.2/day.

7. A method for making a flexible hose according to claim 1, characterized in that said method comprises the step of applying, inside said flexible hose, at least a layer of a low fuel vapor permeability material.

8. A method according to claim 7, characterized in that said low fuel vapor permeability material is applied by fixing the two surfaces of said material on respective adjoining layers of said flexible hose.

9. A method according to claim 8, characterized in that said fixing is made by glueing or thermally processing said low fuel vapor permeability material layer.

10. A flexible hose for conveying fuels as defined in claim 1 wherein inner layer (2) is made of rubber.

11. A flexible hose for conveying fuels as defined in claim 1 wherein inner layer (2) is made of a polymer.

* * * * *